United States Patent [19]
Bronicki

[11] 3,961,199
[45] June 1, 1976

[54] SUPERCHARGER SYSTEM FOR COMBUSTION ENGINE

[75] Inventor: Lucien Y. Bronicki, Rehovot, Israel

[73] Assignee: Ormat Turbines (1965) Ltd., Yavne, Israel

[22] Filed: Apr. 8, 1974

[21] Appl. No.: 453,043

[52] U.S. Cl. ............................. 290/52; 123/179 E; 123/180 E; 60/606; 123/180 P
[51] Int. Cl.² .......................................... F02B 37/00
[58] Field of Search .............. 290/52; 60/598, 605, 60/606; 123/119, 179 E, 180 E, 180 P

[56] References Cited
UNITED STATES PATENTS

| | | | |
|---|---|---|---|
| 2,839,038 | 6/1958 | Middlebrooks | 23/119 C |
| 2,939,017 | 5/1960 | Teague et al. | 290/52 |
| 3,163,984 | 1/1965 | Dumont | 123/119 C |
| 3,676,999 | 7/1972 | Oldfield | 60/606 |
| 3,680,305 | 8/1972 | Miller | 123/119 C |

*Primary Examiner*—Robert K. Schaefer
*Assistant Examiner*—John W. Redman
*Attorney, Agent, or Firm*—Browdy and Neimark

[57] ABSTRACT

A supercharging system for a vehicle having an internal combustion engine comprises a shaft carrying a gas turbine rotor at one axial end and a centrifugal air compressor rotor at the other axial end. A pair of bearings mounting the shaft for rotation in a housing are adapted to be attached to the vehicle, the housing at one axial end a turbine nozzle ring and a turbine exhaust ring cooperable with the turbine rotor, and having at the other axial end an axially located compressor inlet member and a radially located compressor outlet member cooperable with the compressor rotor. The turbine nozzle ring is adapted to be connected to the exhaust manifold of the engine and the compressor outlet member is adapted to be connected to the intake manifold of the engine thereby supercharging the same. Finally, an electrical generator is integrally incorporated into the housing for generating electrical power when the shaft is rotating, the generator comprising a generator rotor mounted on the shaft between the bearings, and a generator stator mounted in the housing in cooperative relationship with the generator rotor.

4 Claims, 3 Drawing Figures

SUPERCHARGER SYSTEM FOR COMBUSTION ENGINE

This invention relates to a supercharger system for a vehicle having an internal combustion engine, and more particularly to a supercharger system having an electrical generator integrally associated therewith.

Heavy armoured military vehicles are conventionally powered for cross-country movement by a heavy duty diesel engine whose available work output is substantially increased by supercharging. Such supercharging usually is accomplished by an auxiliary device having a turbine rotor and a compressor rotor mounted on a common shaft, the exhaust gases of the engine being expanded in the turbine thus driving the compressor rotor and compressing ambient air which is delivered to the intake manifold of the engine. For many reasons not significant here, the engine will reliably provide sufficient power to develop the rated tractive effort for the vehicle only if overhauled at relatively frequent intervals. For example, in some heavy tanks, only 300 hours of engine operation is permitted before engine overhaul is required. Therefore, any operation of the engine not required for vehicle movement is extremely costly in terms of vehicle combat effectiveness.

In considering heavy tanks, operation of the engine for reasons other than vehicle movement is usually required, however, because of the electrical demands imposed on the electrical power supply of the tank. Such electrical demands arise from the complicated communication and weapon systems carried by the tank. As evermore sophisticated systems are added to existing vehicles, the electrical power requirements approach and sometimes exceed the vehicle generating capacity which is limited by the engine and generator package size.

To ensure a sufficient power reserve, banks of storage batteries are provided in the vehicle. In this way, it is possible for a tank, for example, to be standing by in a field situation for a given period of time with the engine idle and with all of its systems fully powered. Eventually, however, a point is reached where the batteries are no longer capable of sustaining full power operation of the systems; and in such case, it is necessary to start up the engine and recharge the batteries if the vehicle is to remain in a position ready for tactical operations. Starting and operating the engine under these conditions is not desirable for two reasons: first of all, engine life is sacrificed as indicated above, and the period of field use of the vehicle is correspondingly diminished; and secondly, the sound of engine operation under field conditions may be undesirable from a tactical viewpoint.

Marginal increases in the electrical capacity of the generating system of existing vehicles have been achieved at a high economic cost by improving the generator design; but the upper limit for power generation is dictated ultimately by the tolerable physical size of the generator, and the strength of the existing mechanical coupling between the engine and the generator. Despite such improvements in generator design, many vehicles exist wherein fully powered operation of the electrical equipment on board can be carried out only by a combination of engine operation and the use of reserve battery power.

It is therefore an object of the present invention to increase the generating capacity of a vehicle provided with a supercharged internal combustion engine without increasing the size or capacity of either its engine or its standard electrical generating system.

The present invention provides a supercharging system for a vehicle having an internal combustion engine comprising a shaft carrying a gas turbine rotor at one axial end and a centrifugal air compressor rotor at the other axial end; a pair of bearings mounting the shaft for rotation in a housing adapted to be attached to the vehicle; the housing having at one axial end a turbine nozzle ring and a turbine exhaust ring cooperable with the turbine rotor, and having at the other axial end an axially located compressor inlet member and a radially located compressor outlet member cooperable with the compressor rotor; the turbine nozzle ring adapted to be connected to the exhaust manifold of the engine and the compressor outlet member adapted to be connected to the intake manifold of the engine thereby supercharging the same; and an electrical generator integrally incorporated into the housing for generating electrical power when the shaft is rotating, the generator comprising a generator rotor mounted on the shaft between the bearings, and a generator stator mounted in the housing in cooperative relationship with the generator rotor.

Because the electrical generator is integrally associated with and made a part of the vehicle supercharger system, no additional space is required inside the vehicle making the invention ideally suited for incorporation into existing vehicles requiring an increase in electrical power. By efficient design of the electrical generator incorporated into the supercharger, the electrical generating capacity of the engine may be increased as much as 20%.

In addition to achieving an increase in the power generating capacity of the engine, the incorporation of the generator into a supercharger raises the possibility of providing electrical power for recharging the batteries of a vehicle without utilizing its internal combustion engine. This desirable result is achieved in the present invention by providing an auxiliary combustion chamber whose output is selectively connectable to the turbine nozzle ring for furnishing combustion gases to the turbine rotor when the engine is idle, and an intake valve connected to the compressor output for selectively connecting the output of the compressor to either the inlet of the combustion chamber when the engine is idle or to the intake manifold of the engine when the latter is running, and an auxiliary compressor for supplying start-up compressed air to the inlet of the combustion chamber until the main compressor produces sufficient air to sustain operation of the turbine.

With this arrangement, recharging of the batteries of a vehicle can be achieved while the main engine is idle by merely supplying fuel to the combustion chamber and powering the auxiliary compressor until the supercharger compressor reaches sufficient speed, at which time the output of the supercharger compressor can be switched into the inlet of the auxiliary combustion chamber providing a self-sustaining gas turbine drive generator that is independent of the operation of the diesel engine of the vehicle. Thus, the vehicles' batteries can be charged without sacrificing engine life.

An embodiment of the invention is illustrated by way of example in the accompanying drawings, wherein.

Figure 1:
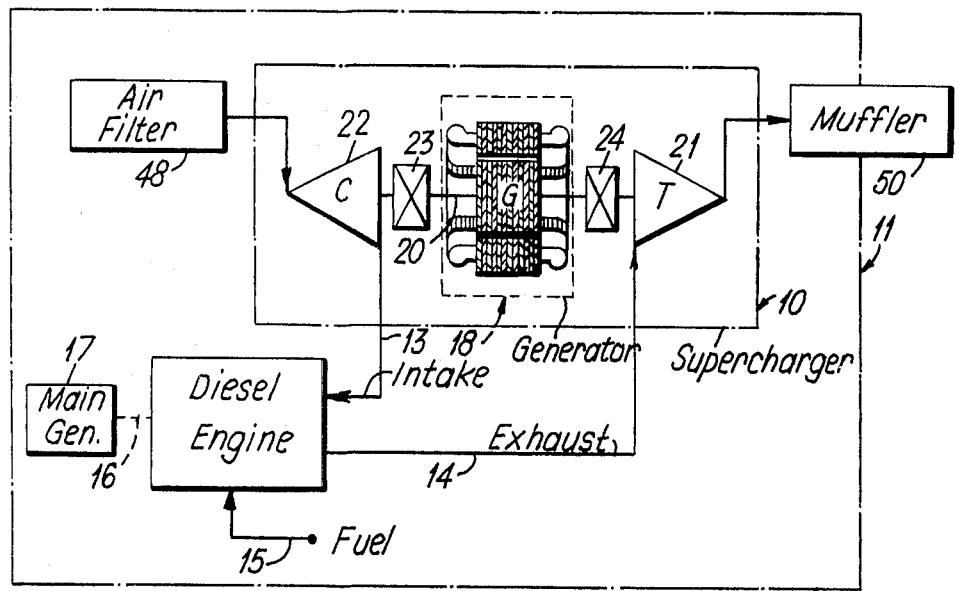
FIG. 1 is a block diagram showing, in a schematic form, a vehicle into which the present invention is incorporated.

Referring now to FIG. 1 of the drawing, reference numeral 10 designates a supercharger system according to the present invention incorporated into a vehicle 11 having a supercharged internal combustion engine 12. Vehicle 11 may be, for example, a tank or other heavy vehicle provided with a supercharged diesel engine having an intake manifold 13 and an exhaust manifold 14. When fuel from line 15 is injected into the cylinders (not shown) of the engine, the vehicle is powered in a conventional manner through a gear box (not shown) operatively associated with the engine.

Mechanically coupled to the engine 12 with a direct shaft connection 16 from the engine is the main electrical generator 17 of the vehicle which is part of the electrical system including batteries (not shown) of the vehicle. The package size and configuration of the engine and generator in existing vehicles are of course fixed as is the maximum torque that the engine can transfer to the generator through the shaft connection 16. If the connection 16 operates at its maximum torque transmission characteristics, which is the usual case, an increase in generating capacity of the vehicle can be achieved only by replacing the existing generator 17 with one that is more efficient. This expedient provides a marginal increase in generating capacity but at a substantial increase in cost.

Figure 3:
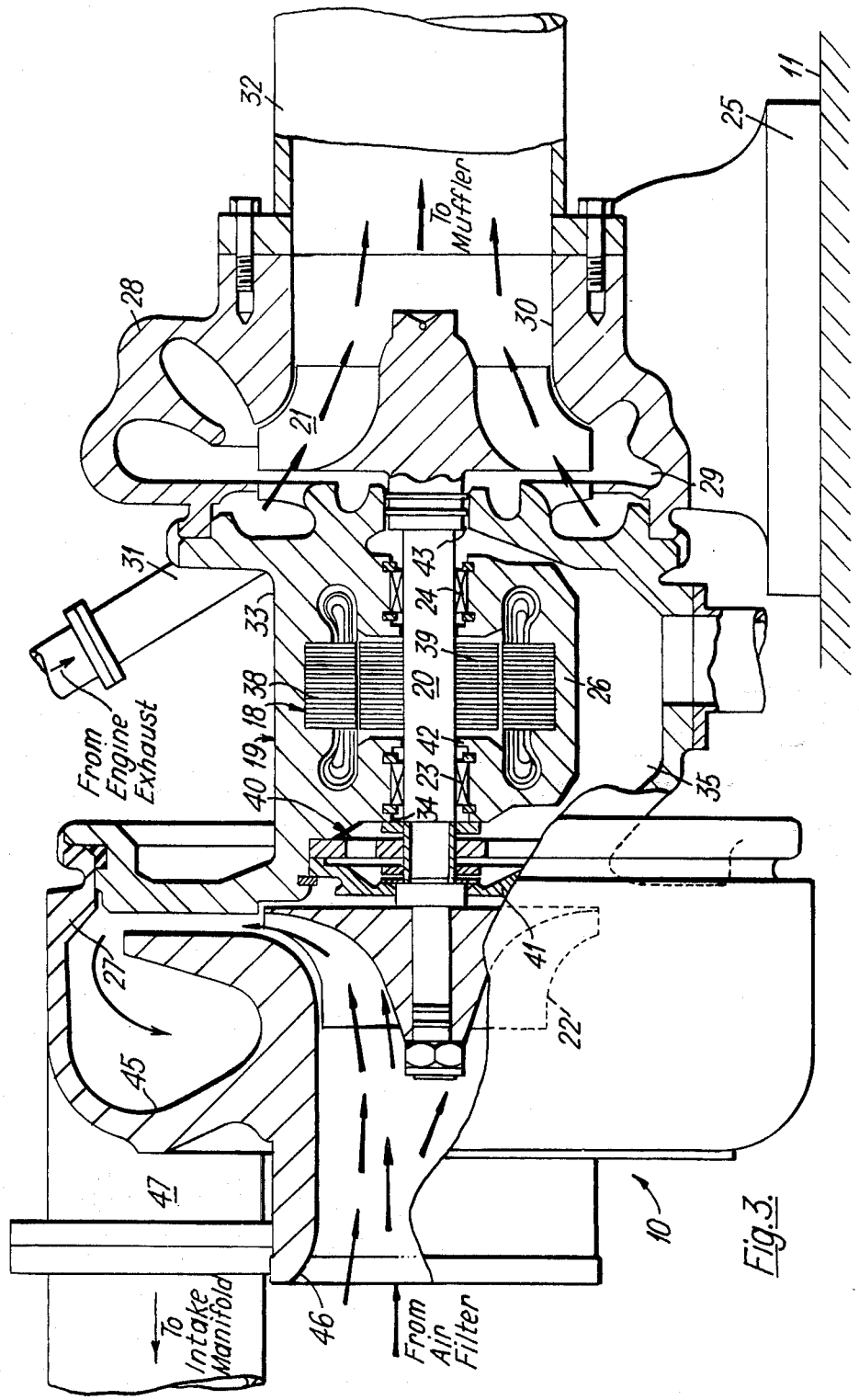
FIG. 3 is a sectional view of a conventional supercharger into which an electrical generator has been integrally incorporated.

What is needed is an additional source of generating capacity that does not take up any room in the vehicle, and such an additional source is the supercharger system 10 which comprises a generator 18 integrally incorporated into the housing 19 of the engine supercharger (see FIG. 3). System 10 comprises a shaft 20 carrying a gas turbine rotor 21 at one axial end and a centrifugal air compressor 22 at the other axial end, a pair of bearings 23, 24 mounted on the shaft for rotation in the central portion 26 of the housing, which portion is interposed between and connected to the two end portions 27 and 28. End portion 28 has a base 25 by which the housing 19 is secured to the chassis of vehicle 11 and has an upstream end defining a turbine nozzle ring 29 and a downstream end defining a turbine exhaust ring 30, both rings being cooperable with gas turbine rotor 21. Conduit 31 connects the exhaust manifold 14 of engine 12 to the turbine nozzle ring 29 while conduit 32 connects the exhaust ring 30 to a muffler 16, if a muffler is utilized in the vehicle.

Central portion 26 of the housing 19 is a unitary casting comprising a central hub 33 carrying an axial bore 34 and a pair of flanges at each axial end, which flanges mate with and seal against corresponding flanges on each of the end portions 27 and 28 of the housing. Oil sump 35 is formed in the bottom of the central portion 26 below the hub 33 for collecting lubricating oil that is circulated through the main bearings 23 and 24 mounted within the axial bore 34. The central portion 26 also provides a mounting for generator stator 38 of generator 18 cooperatively associated with generator rotor 39 rigidly secured to and rotatable with the shaft 20 between the bearings 23 and 24. Between the bearing 23 and the compressor rotor 22, shaft 20 is provided with a step within which is mounted thrust bearing 40 whose stationary race bears against the central portion 26. An oil splash shield 41 separates the compressor rotor from the radial and thrust bearings on the shaft; and oil seals 42 located between the bearings 23 and 24 and the generator rotor 39 are provided on hub 33 in cooperable relationship with shaft 20 for the purpose of keeping lubricating oil furnished to the bearings 23 and 24 from being thrown into the generator 18. Finally, seal 43 located on the central portion 26 adjacent the enlarged hub of the shaft where it merges into the turbine rotor provides a gas-tight seal which prevents leakage of exhaust gases into the oil sump of the supercharger.

End portion 27 of the supercharger system has an upstream end defining a radially located compressor outlet member 45 and a downstream end defining an axially located compressor inlet member 46, both members being cooperable with compressor rotor 22. Member 45 is connected by conduit 47 to the intake manifold 13 of the engine while member 46 is connected to ambient air through air filter 48 (see FIG. 1).

In operation, exhaust gases produced by the operation of the engine 12 are expanded in turbine rotor 21 driving shaft 20 and rotating compressor rotor 22 which forces compressed air through the conduit 47 into the intake manifold 13 of the engine thereby materially increasing its work output. Simultaneously, the generator 18 (which takes up no extra space but is situated between the bearings 23 and 24 of the supercharger), supplements the output of main generator 17. Because the supercharger is a standard component, only the central portion 26 of the housing of the supercharger need be modified to accommodate generator 18, thus permitting the present invention to be integrally incorporated into existing installations. Thus, no extra space is required for this auxiliary generator which supplements the existing engine generator. In this manner, additional electrical systems can be incorporated into the vehicle with the assurance that adequate power will be available.

Figure 2:
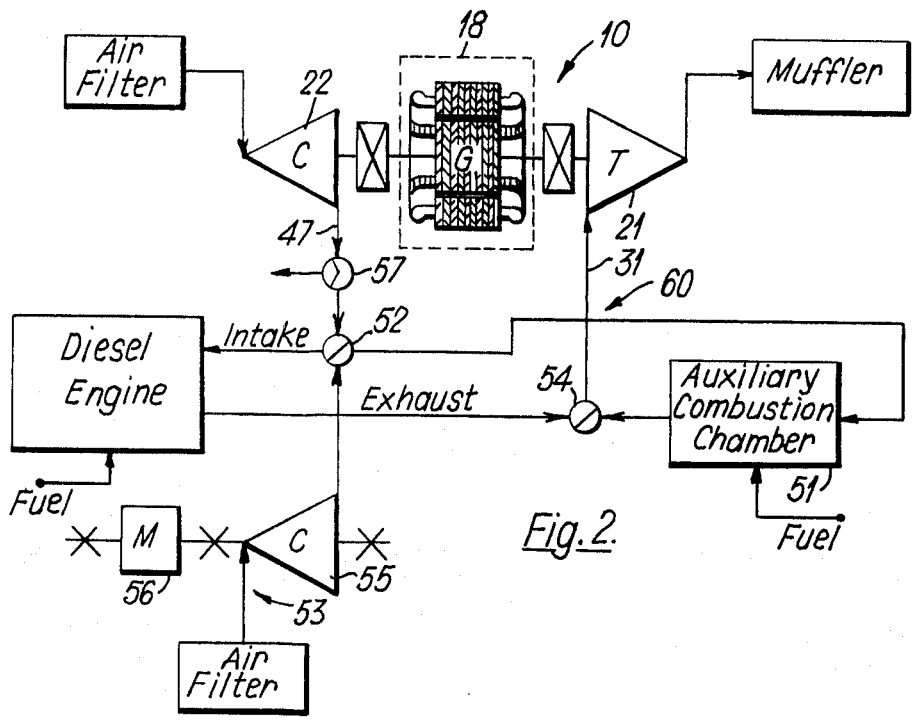
FIG. 2 is an improved version of the device shown in FIG. 1 permitting operation of the supercharger generator independently of the operation of the diesel engine of the vehicle.

In order to generate power independently of the operation of the engine 13, system 60 shown in FIG. 2 can be utilized. System 60 comprises the supercharger system 10 shown in detail in FIGS. 1 and 3, in combination with an auxiliary combustion chamber 51, an intake valve 52, and start-up apparatus 53 all arranged so that the turbine 21 of the supercharger system can be driven either by exhaust gases from the engine 12 or by the output of the auxiliary combustion chamber 51 (which is preferably designed to burn the same fuel as is used in engine 12). Combustion chamber 51 is selectively connectible, by means of valve 54, to conduit 31 associated with the nozzle ring of turbine 21 for furnishing combustion gases to the turbine rotor when the engine is idle. Thus, rotation of valve 54 through 90° in either direction from the position shown in FIG. 2 will disconnect the exhaust manifold from the conduit 31 and connect the outlet of the combustion chamber to this turbine inlet conduit 31.

Valve 52 in the outlet conduit of the compressor has a first position at which the output of the compressor 22 is directed into the intake manifold of the engine for normal supercharging operation, and a second position at which the output of the compressor is directed into the inlet of the auxiliary combustion chamber 51. In the preferred embodiment of the invention, compressor 55 is driven by electric motor 56 of the apparatus 53, and the output of the compressor is connected to the inlet of the combustion chamber 51 when valve 52 is in its first position as shown in FIG. 2. When valve 52 is rotated to its second position, the output of compressor 55 is disconnected from the inlet to combustion chamber 51.

System 60 is made operative when it is necessary to generate electrical power without operation of the main engine 12. First, valve 52 remains in the position shown in FIG. 2 but valve 54 is turned through 90° from its position shown in FIG. 2. In addition, conduit 47 may be vented by rotating valve 57. Power is supplied to motor 56 of apparatus 53 causing compressed air to be fed into the inlet of combustion chamber 51 wherein fuel fed to the combustion chamber is burned producing combustion gases that pass by way of valve 54 into turbine 21. The gases expand within the turbine turning the same and causing the speed of the shaft 20 to gradually build up. This situation continues until the output of compressor 22 reaches a level that will sustain operation of turbine 21. When this level is reached, the venting of the output of compressor 22 through valve 57 is terminated, and valve 52 is rotated to its second position disconnecting the output of compressor 55 from the inlet to the combustion chamber 51 whilst simultaneously connecting the output of compressor 22 to the inlet of the combustion chamber. At this point the operation of motor 56 may be discontinued and the turbine 21 and compressor 22 will operate as a gas-turbine powered electric generator unit in conjunction with auxiliary combustion chamber 51 for as long as fuel is supplied to the auxiliary combustion chamber. In this manner, the output of generator 18 of the supercharger system 10 is available for charging the vehicle batteries while engine 12 remains idle. The volume required for the start-up apparatus 53 and the auxiliary combustion chamber 51 is relatively small yet significantly increases flexibility in the operation of the vehicle in a manner not heretofore possible.

The valve arrangement designated by reference numerals 52, 54 and 57 is only illustrative of one type of valve arrangement for combining the operation of system 10 with the operation of system 60, and other forms of valving associated with starting-up gas turbine power plants can be utilized. In addition, system 10 together with system 60 could be utilized separately from a vehicle. Thus, system 10 being an item usually carried in inventory for a fleet of vehicles and thus available separately from a vehicle, could be mated with a separate system 60 for the purpose of providing a portable electrical power generating system that is independent of a vehicle.

I claim:

1. A supercharger system for a vehicle having an internal combustion engine comprising:
    a shaft carrying a gas turbine rotor at one axial end and a centrifugal air compressor rotor at the other axial end; a pair of bearings mounting the shaft for rotation in a housing adapted to be attached to the vehicle;
    the housing having at one axial end a turbine nozzle ring and a turbine exhaust ring cooperable with the turbine rotor, and having at the other axial end an axially located compressor inlet member and a radially located compressor outlet member cooperable with the compressor rotor;
    the turbine nozzle ring adapted to be connected to the exhaust manifold of the engine and the compressor outlet member adapted to be connected to the intake manifold of the engine thereby supercharging the same;
    an electrical generator integrally incorporated into the housing for generating electrical power when the shaft is rotating, the generator comprising a generator rotor mounted on the shaft between the bearings, and a generator stator mounted in the housing in cooperative relationship with the generator rotor; and
    an auxiliary combustion chamber whose output is selectively connectable to the turbine nozzle ring for furnishing combustion gases to the turbine rotor when the engine is idle, an intake valve for selectively connecting the output of the compressor to either the inlet of the combustion chamber when the engine is idle or to the intake manifold of the engine when the latter is running, and an auxiliary compressor for supplying start-up compressed air to the inlet of the combustion chamber until the main compressor produces a sufficient quantity of air to sustain operation of the turbine.

2. A supercharger system according to claim 1 including an exhaust valve for selectively interconnecting the turbine nozzle ring with either the exhaust manifold of the engine or the outlet of the combustion chamber.

3. A supercharger system according to claim 1 wherein the intake valve is constructed and arranged so that it connects the output of the auxiliary compressor to the inlet of the combustion chamber only until the intake valve is switched to a position at which the output of the main compressor is connected to the inlet of the combustion chamber.

4. A supercharger system according to claim 1 including an electric motor for driving the auxiliary compressor.

* * * * *